March 17, 1970   R. W. SMITH   3,500,687
LIQUID LEVEL DETECTOR
Filed Oct. 14, 1968

INVENTOR.
Robert W. Smith
BY
Thomas N. Young
ATTORNEY

_United States Patent Office_ 3,500,687
Patented Mar. 17, 1970

**3,500,687
LIQUID LEVEL DETECTOR**
Robert W. Smith, Flint, Mich., assignor to General Motors Corporation, Detroit, Mich., a corporation of Delaware
Filed Oct. 14, 1968, Ser. No. 767,216
Int. Cl. G01f 23/10
U.S. Cl. 73—295    5 Claims

ABSTRACT OF THE DISCLOSURE

A liquid level detector comprising a plurality of probe thermistors and a plurality of indicator devices. The probe thermistors are positioned at different levels within a reservoir and are connected with the indicator devices so that as the liquid recedes out of contact with each probe thermistor the resistance of the probe thermistor decreases so as to energize one of the indicator devices and so as to deenergize another one of the indicator devices.

---

The present invention relates to a liquid level detector, and more particularly to a temperature responsive liquid level detector.

In a broad aspect, the liquid level detector of the present invention monitors a plurality of different levels within a liquid reservoir without the need for moving contact devices such as relays and switches. In general, this is accomplished by providing a plurality of temperature sensitive probe resistors or thermistors and a plurality of indicator devices such as electric lamps. The probe thermistors are positioned within the reservoir at the different levels to be monitored and are connected with the indicator devices so as to directly control the energization of the indicator devices as the level of the liquid fluctuates within the reservoir.

In a more specific aspect, the liquid level detector of the present invention continually senses the level of the liquid within the reservoir as the liquid progressively recedes through the different levels and provides a changing indication of the level of the liquid. In general, this is accomplished by connecting each of the probe thermistors in parallel with a different corresponding one of the indicator devices which are connected in series with each other. As the liquid recedes out of contact with each probe thermistor, the resistance of the probe thermistor decreases so as to decrease the current through the corresponding indicator device thereby deenergizing the indicator device and so as to increase the current through the other indicator devices thereby energizing one of the other indicator devices.

In a preferred embodiment of the invention, the liquid level detector includes a plurality of electric indicator lamps each requiring a different energizing current for producing a visual signal from the lamp, and a plurality of probe thermistors each having a negative temperature coefficient of resistance. The indicator lamps are connected in series across a voltage source and each indicator lamp provides a resistance which forms a portion of the total resistance across the voltage source for determining the current through the indicator lamps. The probe thermistors are positioned at different levels within the reservoir and each probe thermistor is connected in parallel with a different corresponding one of the indicator lamps. When the liquid recedes out of contact with each probe thermistor, the temperature of the thermistor increases and the resistance of the thermistor decreases due to the absence of cooling by the liquid. As the resistance of the thermistor decreases, the thermistor shunts the corresponding indicator lamp thereby lowering the total resistance across the voltage source so that the current through the corresponding indicator lamp decreases below the energizing current of the lamp thereby terminating the visual signal from the lamp and so that the current through the other indicator lamps increases above the energizing current of one of the other lamps thereby initiating a visual signal from the lamp.

The invention may be best understood by reference to the following detailed description of the preferred embodiments when considered in conjunction with the accompanying drawing, in which.

Figure 1:
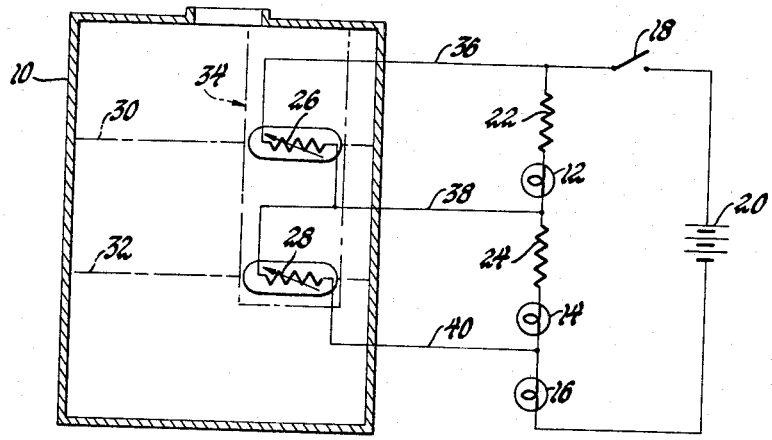
FIGURE 1 is a schematic diagram of a liquid level detector incorporating the principles of the invention.

Referring to FIGURE 1, a liquid level detector is disclosed for indicating the level of a liquid within a reservoir 10. The illustrated liquid level detector includes three indicator devices provided by electric lamps 12, 14 and 16 connected in series through a power switch 18 across a direct current voltage source provided by a battery 20. Two control resistors 22 and 24 are connected with the indicator lamps 12, 14 and 16 so that the resistor 22 is connected in series with the lamp 12 and the resistor 24 is connected in series with the lamp 14. Two temperature sensitive probe resistors or thermistors 26 and 28 are positioned within the reservoir 10 at upper and lower levels 30 and 32 by a probe assembly 34. The probe thermistors 26 and 28 are connected with the indicator lamps 12, 14 and 16 and the control resistors 22 and 24 through conductors 36, 38 and 40 so that the thermistor 26 is connected in parallel with the lamp 12 and the resistor 22 and the thermistor 28 is connected in parallel with the lamp 14 and the resistor 24.

The indicator lamps 12, 14 and 16 each require a different energizing current therethrough for producing a sensible or visual signal. The energizing current of the lamp 12 is lower than the energizing current of the lamp 14 which is lower than the energizing current of the lamp 16. The energizing current through the indicator lamps 12, 14 and 16 is determined by the total resistance across the battery 20. The indicator lamps 12, 14 and 16 each provide an internal resistance which forms a portion of the total resistance across the battery 20 for establishing the magnitude of the current through the lamps 12, 14 and 16. The total resistance across the battery 20 also includes the resistance of the control resistors 22 and 24 and the resistance of the probe thermistors 26 and 28.

Figure 2:
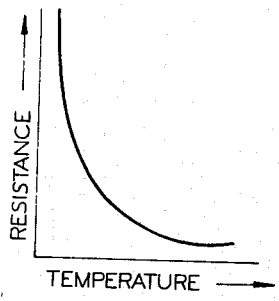
FIGURE 2 is a graph illustrating the characteristic curve of a typical negative temperature coefficient resistor or thermistor.

The probe thermistors 26 and 28 each have a negative temperature coefficient of resistance. FIGURE 2 illustrates the characteristic curve of a typical negative temperature coefficient resistor or thermistor. Referring to FIGURE 2, it will be observed that as the temperature of the thermistor gradually increases, the resistance of the thermistor rapidly decreases, and conversely, as the temperature of the thermistor decreases, the resistance of the thermistor rapidly increases.

In operation, when the power switch 18 is closed, current flows from the battery 20 through the indicator lamps 12, 14 and 16 and the control resistors 22 and 24 and through the probe thermistors 26 and 28. The current through the probe thermistors 26 and 28 tends to generate heat which increases the temperature of the thermistors 26 and 28 thereby decreasing the resistance of the thermistors 26 and 28. However, when the probe thermistors 26 and 28 and in contact with the liquid, the heat generated by the current flowing through the thermistors 26 and 28 is readily conducted away from the thermistors 26 and 28 by the liquid because the liquid has a relatively high heat transfer characteristic. Thus, the temperature of the probe thermistors 26 and 28 decreases due to the presence of cooling by the liquid thereby increasing the resistance of the thermistors 26 and 28. When the probe thermistors 26 and 28 are out of contact with the liquid and in contact with the air, the heat generated by the current flowing through the thermistors 26 and 28 is not readily conducted away from the thermistors 26 and 28 by the air because the air has a relatively low heat transfer characteristic. Thus, the temperature of the probe thermistors 26 and 28 increases due to the absence of cooling by the liquid thereby decreasing the resistance of the thermistors 26 and 28.

Assuming the liquid within the reservoir 10 is at or above the upper level 30, the liquid is in contact with the probe thermistors 26 and 28 so that the resistance of the thermistors 26 and 28 increases due to the presence of cooling by the liquid. The resistance of each of the probe thermistors 26 and 28 is relatively large compared to the internal resistance of each of the indicator lamps 12, 14 and 16 so that the major portion of the current from the battery 20 flows through the lamps 12, 14 and 16. The resistance of each of the indicator lamps 12, 14 and 16 and each of the control resistors 22 and 24 is selected so that the current through the lamps 12, 14 and 16 is above the energizing current of the lamp 12 and below the energizing current of the lamps 14 and 16 so as to initiate a visual signal from the lamp 12.

Assuming the liquid within the reservoir 10 recedes to a level below the upper level 30 and at or above the lower level 32, the liquid is out of contact with the probe thermistor 26. Therefore, the heat generated by the current through the probe thermistor 26 increases the temperature of the thermistor 26 due to the absence of cooling by the liquid thereby decreasing the resistance of the thermistor 26. As the resistance of the probe thermistor 26 decreases, it shunts the indicator lamp 12 so that the current through the thermistor 26 increases thereby decreasing the current through the lamp 12 below the energizing current of the lamp 12 so as to terminate the visual signal from the lamp 12. Since the indicator lamp 12 is shunted by the probe thermistor 26, the total resistance across the battery 20 decreases thereby increasing the current through the indicator lamps 14 and 16. The internal resistance of each of the indicator lamps 14 and 16 is selected so that the current through the lamps 14 and 16 is above the energizing current of the lamp 14 and below the energizing current of the lamp 16 so as to initiate a visual signal from the lamp 14.

Assuming the liquid within the reservoir 10 recedes to a level below the lower level 32, the liquid is out of contact with the probe thermistor 28. Therefore, the heat generated by the current through the probe thermistor 28 increases the temperature of the thermistor 28 due to the absence of cooling by the liquid thereby decreasing the resistance of the thermistor 28. As the resistance of the probe thermistor 28 decreases, it shunts the indicator lamp 14 so that the current through the thermistor 28 increases thereby decreasing the current through the lamp 14 below the energizing current of the lamp 14 so as to terminate the visual signal from the lamp 14. Since the indicator lamp 14 is shunted by the probe thermistor 28, the total resistance across the battery 20 decreases thereby increasing the current through the indicator lamp 16. The internal resistance of the indicator lamp 16 is selected so that the current through the lamp 16 is above the energizing current of the lamp 16 so as to initiate a visual signal from the lamp 16.

It will now be apparent that the control resistors 22 and 24 merely permit greater latitude in selecting the indicator lamps 12, 14 and 16 in order to achieve the desired operation. The control resistors 22 and 24 combine with the internal resistance of the indicator lamps 12 and 14 so as to increase the resistance across each of the probe thermistors 26 and 28 so that as the resistance of each of the thermistors 26 and 28 decreases the change in the total resistance across the battery 20 is magnified so as to magnify the resulting change in the current through the indicator lamps 12, 14 and 16. Thus, the control resistors 22 and 24 may be eliminated where the internal resistance of the indicator lamps 12, 14 and 16 alone is sufficient to properly regulate the current through the lamps 12, 14 and 16 as previously described.

In the alternative, the control resistors 22 and 24 may be temperature sensitive resistors or thermistors each having a negative temperature coefficient of resistance. In such instance, the control thermistors 22 and 24 not only establish the magnitude of the current through the indicator lamps 12, 14 and 16 but also accelerate the transitions in the current through the lamps 12, 14 and 16 so as to produce sharp visual signals from the lamps 12, 14 and 16. The resistance of each of the control thermistors 22 and 24 is relatively large compared to the resistance of each of the probe thermistors 26 and 28.

In operation, when the power switch 18 is closed, the major portion of the current from the battery 20 initially flows through the probe thermistor 26. However, the heat generated by the portion of the current through the indicator lamp 12 and the control thermistor 22 gradually increases the temperature of the thermistor 22 until the resistance of the thermistor 22 rapidly decreases. As the resistance of the control thermistor 22 quickly decreases, the current through the control thermistor 22 and the indicator lamp 12 rapidly increases above the energizing current of the lamp 12 so as to sharply initiate a visual signal from the lamp 12. Since the resistance of the control thermistor 24 is relatively large compared to the resistance of the probe thermistor 28, the major portion of the current through the indicator lamp 12 and the control thermistor 22 also flows through the probe thermistor 28. The heat generated by the portion of the current flowing through the indicator lamp 14 and the control thermistor 24 is insufficient to appreciably increase the temperature of the thermistor 24.

When the liquid recedes out of contact with the probe thermistor 26, the current through the thermistor 26 increases so as to decrease the current through the indicator lamp 12 and the control thermistor 22. As the current through the control thermistor 22 decreases, the temperature of the thermistor 22 gradually decreases until the resistance of the thermistor 22 rapidly increases. As the resistance of the control thermistor 22 quickly increases, the current through the thermistor 22 and the indicator lamp 12 rapidly decreases below the energizing current of the lamp 12 so as to sharply terminate the visual signal from the lamp 12 and so as to rapidly increase the current through the probe thermistor 26. Since the resistance of the control thermistor 24 is relatively large compared to the resistance of the probe thermistor 28, the major portion of the current through the probe thermistor 26 initially flows through the probe thermistor 28. However, the heat generated by the portion of the current flowing through the indicator lamp 14 and the control thermistor 24 gradually increases the temperature of the thermistor 24 until the resistance of the thermistor 24 rapidly decreases. As the resistance of the control thermistor 24 quickly decreases, the current through the control thermistor 24 and the indicator lamp 14 rapidly increases above the energizing current of the lamp 14 so as to sharply initiate a visual signal from the lamp 14.

When the liquid recedes out of contact with the probe thermistor 28, the current through the thermistor 28 increases so as to decrease the current through the indicator lamp 14 and the control thermistor 24. As the current through the control thermistor 24 decreases, the temperature of the thermistor 24 gradually decreases until the resistance of the thermistor 24 rapidly increases. As the resistance of the control thermistor 24 quickly increases, the current through the control thermistor 24 and the indicator lamp 14 rapidly decreases below the energizing current of the lamp 14 so as to sharply terminate the visual signal from the lamp 14 and so as to rapidly increase the current through the probe thermistor 28 and the indicator lamp 16 above the energizing current of the lamp 16 so as to sharply initiate a visual signal from the lamp 16.

It will now be appreciated that ordinary resistors, or temperature sensitive resistors, or a combination of ordinary resistors and temperature sensitive resistors may be employed to provide the control resistors 22 and 24. Thus, the control resistor 22 may be an ordinary resistor and the control resistor 24 may be a temperature sensitive resistor or thermistor. In a liquid level detector constructed in accordance with the embodiment of the invention illustrated in FIGURE 1, the following component values were determined to yield satisfactory performance.

Figure 3:
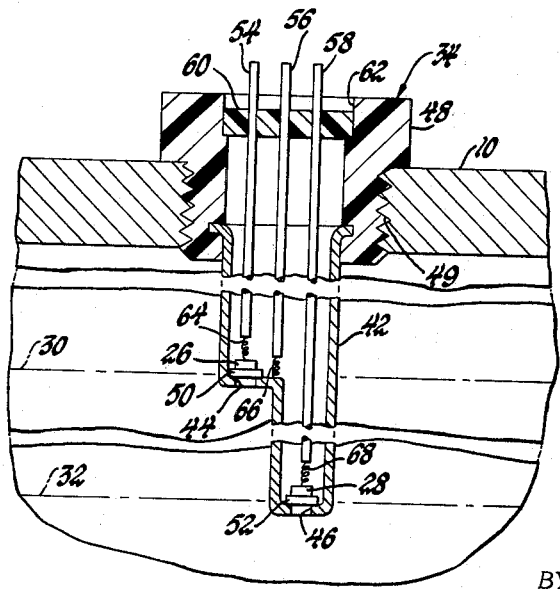
FIGURE 3 is a cross-sectional view of a probe assembly which may be employed in practicing the invention.

Indicator lamp 12—No. 49 incandescent
Indicator lamp 14—No. 14 incandescent
Indicator lamp 16—No. 136 incandescent
Probe thermistor 26—NTC–175 ohms
Probe thermistor 28—NTC–34 ohms
Control resistor 22—150 ohms
Control thermistor 24—NTC–200 ohms FIGURE 3 discloses a probe assembly 34 which may be employed in conjunction with the liquid level detector illustrated in FIGURE 1 for providing a support structure to mount the probe resistors 26 and 28 within the reservoir 10 and for providing a conductor structure to aid the connection of the probe thermistors 26 and 28 with the indicator lamps 12, 14 and 16 and the control resistors 22 and 24. The probe assembly 34 includes a hollow elongated probe body 42 having two spaced apertures 44 and 46 formed transversely along its length. The probe body 42 is attached to a threaded fastener 48 which is inserted within a tapped hole 49 in the upper portion of the reservoir 10 so as to mount the probe body 42 in such a manner that it extends into the liquid so that the apertures 44 and 46 are located at the upper and lower levels 30 and 32. The probe body 42 is made of an electrically conductive material, while the fastener 48 is made of an electrically insulating material. The probe thermistors 26 and 28 are mounted on substrates 50 and 52 which are sealingly positioned over the apertures 44 and 46. The substrates 50 and 52 are made of a thermally and electrically conductive material. The probe thermistors 26 and 28 are in thermal conducting relationship with the liquid through the substrates 50 and 52 and the apertures 44 and 46. Similarly, one end of the probe thermistors 26 and 28 is electrically connected to the probe body 42 through the substrates 50 and 52.

Three terminal rods 54, 56 and 58 are supported in a plug 60 which fits within a recess 62 formed in the fastener 48 so as to mount the rods 54, 56 and 58 in such a manner that they extend into the probe body 42 and out of the plug 60. Three coil springs 64, 66 and 68 are attached to the portion of the terminal rods 54, 56 and 58 extending into the probe body 42. The springs 64 and 68 are loaded in compression against the probe thermistors 26 and 28 so as to electrically connect the terminal rods 54 and 58 to one end of the thermistors 26 and 28. The spring 66 is loaded in compression against the probe body 42 so as to electrically connect the terminal rod 56 to the other side of the probe thermistors 26 and 28 through the probe body 42. The terminal rods 54, 56 and 58 and the coil springs 64, 66 and 68 are made of an electrically conductive material, while the plug 60 is made of an electrically insulating material. The conductors 36, 38 and 40 are appropriately joined to the portion of the terminal rods 54, 56 and 58 extending out of the plug 60 so as to connect the probe thermistors 26 and 28 with the indicator lamps 12, 14 and 16 and the control resistors 22 and 24 as previously described.

It will be now be apparent that the invention provides a simple and reliable liquid level detector which is adaptable to a wide variety of applications. For example, the inventive liquid level detector may be applied to monitor the level of the liquid within the cooling system of an automotive vehicle having a liquid cooled engine. In such instance, the reservoir 10 may be the vehicle cooling system reservoir, the battery 20 may be the vehicle battery, and the power switch 18 may be the vehicle ignition switch. The indicator lamps 12, 14 and 16 may be colored so that the lamp 12 is green, the lamp 14 is yellow, and the lamp 16 is red, and the indicator lamps 12, 14 and 16 may be located within the interior of the vehicle so as to be visually perceived by the vehicle operator. The probe thermistors 26 and 28 may be positioned at upper and lower levels 30 and 32 within the vehicle cooling system reservoir so that when the liquid is at and above the upper level 30 the liquid is at a normal level and the green lamp 12 is illuminated, and so that when the liquid is below the upper level 30 and at or above the lower level 32 the liquid is at a caution level and the yellow lamp 14 is illuminated, and so that when the liquid is below the lower level 32 the liquid is at a danger level and the red lamp is illuminated.

It is to be noted that the preferred embodiments of the invention described herein are merely illustrative and various modifications may be made without departing from the spirit and scope of the invention.

What is claimed is:

1. A liquid level detector for indicating the level of a liquid within a reservoir, comprising: a direct current voltage source; a plurality of indicator devices connected in series across the voltage source wherein each indicator device requires a different energizing current for producing a sensible signal from the indicator device, and each indicator device provides a resistance which forms a portion of the total resistance across the voltage source for determining the magnitude of the current through the indicator devices; a plurality of probe thermistors wherein each probe thermistor has a negative temperature coefficient of resistance; conductor means for connecting each probe thermistor in parallel with a different corresponding one of the indicator devices; and support means for positioning each probe thermistor at a different level within the reservoir so that as the liquid recedes out of contact with each probe thermistor the resistance of the probe thermistor decrease due to the absence of cooling by the liquid so that the probe thermistor shunts the corresponding indicator device thereby decreasing the total resistance across the voltage source so as to decrease the current through the corresponding indicator device below the energizing current of the indicator device thereby terminating the sensible signal from the indicator device, and so as to increase the current through the other indicator devices above the energizing current of one of the other indicator devices thereby initiating a sensible signal from the indicator device.

2. A liquid level detector as recited in claim 1 wherein the indicator devices are electric lamps.

3. A liquid level detector as recited in claim 1 including a plurality of control resistors wherein each control resistor is connected in series with a different one of the indicator devices for determining the magnitude of the current through the indicator devices.

4. A liquid level detector as recited in claim 1 including a plurality of control thermistors wherein each control thermistor has a negative temperature coefficient of resistance and each control thermistor is connected in series with a different one of the indicator devices for determining the magnitude of the current through the indicator devices and for accelerating the transitions in the current through the indicator devices so as to produce sharp sensible signals from the indicator devices.

5. A liquid level detector as recited in claim 1 wherein the support means includes a hollow elongated probe body having a plurality of apertures formed transversely along its length, and means for mounting the probe body within the reservoir so that it extends into the liquid in such a manner that the apertures are located at different levels within the liquid, wherein each probe thermistor is positioned over a different one of the apertures so as to be in thermal conducting relationship with the liquid through the aperture; and wherein the conductor means includes a plurality of terminal rods, means for mounting the terminal rods so that they extend within the probe body, and a plurality of springs wherein each spring is attached to a different one of the terminal rods and seated in compression against one of the thermistors.

References Cited

UNITED STATES PATENTS 2,211,606  8/1940  Pratt _____ 73—295

FOREIGN PATENTS 157,099  5/1952  Australia.
1,109,511  5/1955  France.

LOUIS R. PRINCE, Primary Examiner

D. E. CORR, Assistant Examiner